June 30, 1970 F. D. CASSIDY 3,518,640
MAGNETIC MEMORY WITH NOISE-CANCELLATION SENSE WIRING
Filed Jan. 19, 1967
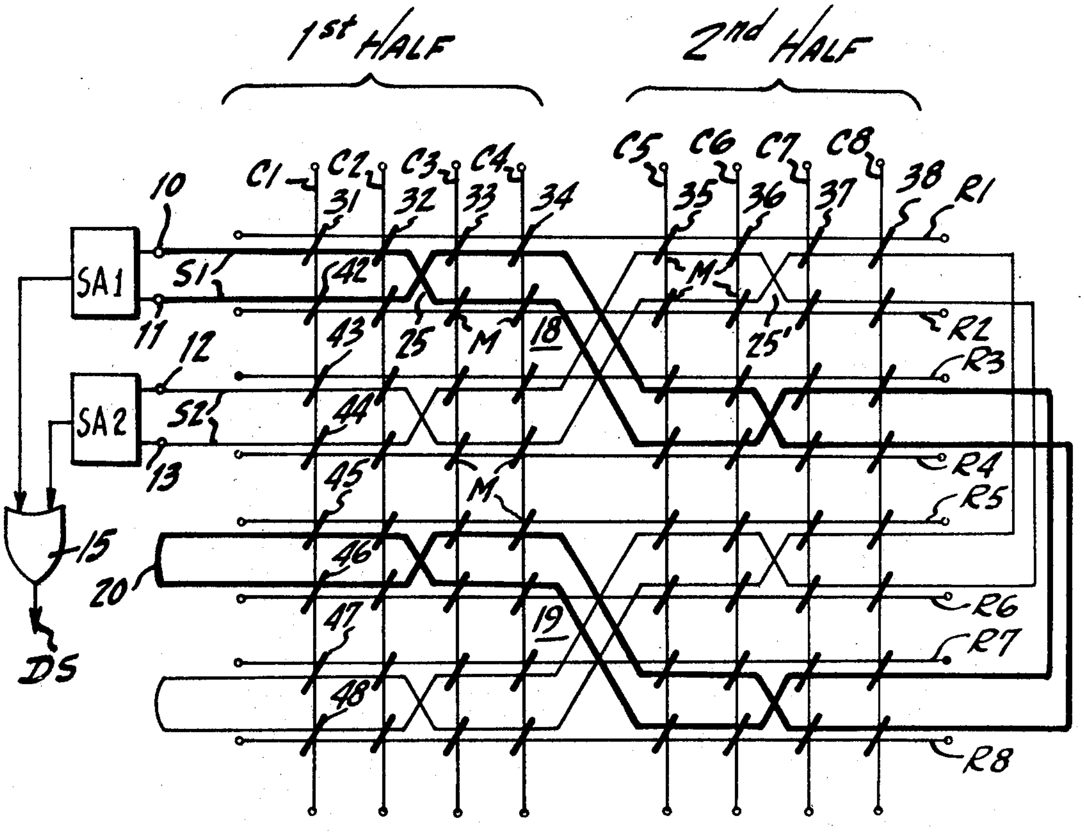
INVENTOR:
FRANCIS D. CASSIDY United States Patent Office 3,518,640
Patented June 30, 1970

3,518,640

MAGNETIC MEMORY WITH NOISE-CANCELLATION SENSE WIRING

Francis D. Cassidy, Townsend, Mass., assignor to RCA Corporation, a corporation of Delaware Filed Jan. 19, 1967, Ser. No. 610,279
Int. Cl. G11c 5/08, 7/02
U.S. Cl. 340—174 2 Claims

ABSTRACT OF THE DISCLOSURE

A sense winding arrangement in a row and column array of memory elements any one of which can be accessed by coincident pulses on one row conductor and one column conductor. Two sense windings are employed in an interleaved criss-cross arrangement which reduces disturbances from half-selected memory elements along the one selected row conductor and the one selected column conductor. A sense output from either one of the sense windings is used as the output from the array.

BACKGROUND OF INVENTION

Electronic data processing equipment customarily includes a random access memory for the storage of many words, each including many binary digits (bits). Such a memory is usually constructed using many magnetic core memory elements arranged in rows and columns to form planes and including many planes to form a memory stack. The magnetic cores are threaded with at least two sets of conductors to provide access to particular cores for the writing in and reading out of digital information.

Each bit array consists of row conductors threading respective rows of magnetic cores, column conductors threading respective columns of magnetic cores, and a single sense winding threading all of the cores in the bit array. One magnetic core in the array is accessed by applying pulses simultaneously to the one row conductor and the one column conductor which thread the particular magnetic core. The remainder of the magnetic cores along the pulsed row conductor and the remainder of the cores along the pulsed column conductor are not selected by a coincidence of pulses but are affected enough by the individual half-select pulses to cause unwanted disturbing signals to be induced on the sense winding. Various sense winding configurations have been developed with the view to effecting a substantial cancellation of the disturbance signals from non-selected magnetic cores. One such sense winding configuration shown in U.S. Pat. No. 3,237,172 issued on Feb. 22, 1966, to K. Gosslau et al. invloves a "bow tie" sense winding extending parallel with the row conductors and having crossovers to accomplish a balancing out of noise in the sense winding.

In designing a bit array of magnetic core memory elements, the numbers of magnetic cores which can be linked by a row conductor, a column conductor and a sense winding are determined by a number of practical engineering considerations involving the transmission characteristics of the conductors and the capabilities of the electronic circuits connected to the conductors. It is often determined that the sense winding in a large bit array should be divided into two or more separate sense windings each coupled to a sense preamplifier. The outputs of the sense preamplifiers may be "OR"ed together to provide the sense output for the entire digit array.

BRIEF SUMMARY OF INVENTION

According to an example of the invention, each of two sense windings is arranged to link half of the memory elements in a bit array of memory elements. The two sense windings are arranged in an interleaved criss-cross manner so that one sense winding links a first half of the cores along alternate pairs of row conductors, the second sense winding links half of the cores along intermediate pairs of row conductors, and the other sense winding links the remaining cores in complementary fashion.

BRIEF DESCRIPTION OF DRAWING

The sole figure of the drawing illustrates an array of memory elements linked by row conductors and column conductors, and linked by two sense windings configured according to the teachings of the invention.

DETAILED DESCRIPTION

The drawing shows a simplified, illustrative memory bit array consisting of magnetic memory elements or cores M arranged in eight rows and eight columns. The eight rows of cores M are linked by eight respective row conductors R1 through R8. The eight columns of magnetic cores M are linked by respective column conductors C1 through C8. The simultaneous application of electric pulses to one row conductor and one column conductor accesses one magnetic memory element M linked by both conductors.

Half of the magnetic cores M are linked by one sense winding S1, and the other half of the magnetic cores M are linked by a second sense winding S2. The sense winding S1 is drawn with thicker lines to more clearly show its criss-cross meandering path through magnetic cores in the array. The terminal ends 10 and 11 of sense winding S1 are connected to the two inputs of a differential sense preamplifier SA1. Similarly, terminal ends 12 and 13 of sense winding S2 are connected to two inputs of a differential sense preamplifier SA2. The outputs of the sense amplifiers SA1 and SA2 are connected through an "or" gate 15 to a digit sense output DS.

A course through the array taken by the sense winding S1 will be described starting from the terminal ends 10 and 11 of the winding. The two ends of the sense winding S1 at terminals 10 and 11 may be viewed as extending therefrom as a two-conductor pair extending in the direction of the row conductors R1 and R2. Also, the adjacent row conductors R1 and R2 may be described as a row conductor pair. To facilitate the description, the row conductor pair R1, R2 and the row conductor pair R5, R6 are designated "alternate" row conductor pairs; and the row conductor pair R3, R4 and the row conductor pair R7, R8 are designated "intermediate" row conductor pairs. Additionally, all row conductor pairs are considered as divided into a first half on the left side of the drawing and a second half on the right side of the drawing.

The conductor paii constituting the sense winding S1 extends from respective terminals 10, 11 and links magnetic cores N along the first half of the row conductor pair R1, R2, then crosses over at 18 and links magnetiic cores along the second half of the row conductor pair R3, R4, then goes down along the right hand edge of the array and links cores along the second half of the row conductor pair R7, R8, crosses over at 19 and links cores along the first half of the row conductor pair R5, R6, and finally at the left edge of the array the two conductors are joined together at 20. The described path of the sense winding S1 can be described as linking the first half of the cores along alternate pairs of row conductors and linking the second half of cores along intermediate pairs of row conductors.

The conductor pair of the second sense winding S2 starts from the terminals 12, 13, passes along the first half of row conductor pair R3, R4, then jumps over and passes along the second half of the row conductor pair R1, R2, and then continues through the array in a similar manner complementary to the manner in which the first sense winding S1 passes through the array.

The portion of the sense winding S1 passing along the first half of the row conductor pair R1, R2 is provided with an intermediate transposition of the two conductors at 25. The conductor of winding S1 starting at terminal 10 links one-fourth of the cores linked by the row conductor R1 and, after the transposition at 25, links one-fourth of the cores linked by the row conductor R2. The transposition of the sense winding S1 at 25 in the first half of the row conductor pair R1, R2 is repeated at the other seven corresponding locations in the array.

In the operation of the bit array shown in the drawing, coincident pulses applied to the row conductor R1 and the column conductor C1, for example, result in an accessing of memory element 31 for storing or retrieving an information bit. The other cores, 32 through 38, along the row conductor R1 receive a single disturbing pulse. Only the cores along the first half of the row conductor R1 are linked by the conductor pair constituting the sense winding S1. Of the four cores 31, 32, 33 and 34 along the row conductor R1 linked by sense winding S1, half of the cores 31 and 32 are linked by the conductor connected to differential sense amplifier terminal 10, and, due to the transposition at 25, the other half of the cores, 33 and 34, are linked by the conductor connected to the other terminal 11 of the differential sense amplifier. The delta noise disturbances generated on the four cores 31, 32, 33 and 34 are of the same polarity so that when applied to the two terminals of the differential sense amplifier SA1 they tend to be canceled in the sense amplifier.

A similar cancellation of undesired delta noise in cores 35, 36, 37 and 38 along the second half of row conductor R1 occurs in the second sense winding S2 due to the transposition at 25'. This type of noise cancellation is accomplished also at the other places in the array having transpositions similar to the transpositions 25 and 25'.

In the operation being described, wherein the magnetic core 31 is selected by the coincident application of pulses to the row conductor R1 and the column conductor C1, an additional advantage is achieved by the arrangement shown in which the array sense winding is divided into two interleaved criss-crossed sense windings S1 and S2. The sense signal induced on sense winding S1 from the selected core 31 is adversely affected by delta noise signals from solely the cores 32, 33 and 34, and not from cores 35, 36, 37 and 38. This is because the cores 35 through 38 are linked by the different, second sense winding S2. Therefore, the noise coupled from sense winding S1 to sense amplifier SA1 is half what it would be if all of the cores 31 through 38 were linked by the sense winding S1.

The selection pulse applied to the column conductor C1 to select core 31 has a disturbing effect on the half-selected cores 42, 43, 44, 45, 46, 47 and 48. However, only the cores 31, 42, 45 and 46 are linked by the sense conductor S1. Stated another way, only half of the cores linked by the column conductor C1 are also linked by the sense conductor S1. It is thus seen that the amplitude of the disturbing delta noise applied to the sense amplifier SA1 due to the half-select pulse applied to column conductor C1 is half what it would be if the sense winding S1 linked all of the cores along the column conductor C1.

The desired reduction in the delta noise induced on sense winding S1 due to the coordinate selection of memory element 31 is also obtained on sense winding S1 or sense winding S2 when any other memory element in the array is selected by the application of coincident selection pulses to one row conductor and one column conductor. The interleaved criss-cross arrangement of the two sense windings results in a reduction by one-half of the disturbances due to half-selected croes.

What is claimed is:

1. The combination of an array of magnetic memory elements arranged in rows and columns, row and column conductors linking said cores to access any one of said memory elements at a time for the reading and writing of binary information, and two sense windings, each of said sense windings including a pair of spaced conductors having adjacent spaced terminal ends and having remote joined ends, said spaced conductors of a pair being spaced the amount of the spacing between adjacent ones of said row conductors, said two sense windings being arranged in an interleaved criss-cross manner in which one sense winding links a first half of the cores along alternate pairs of row conductors and a second half of the cores along intermediate pairs of row conductors, and in which the other one of the sense windings links the remaining cores in complementary fashion.

2. An array of memory elements as defined in claim 1 wherein each sense winding conductor pair has its conductors periodically transposed in relation to the row conductor pair along which the sense pair extends.

References Cited

UNITED STATES PATENTS

| | | | |
|---|---|---|---|
| 3,142,049 | 7/1964 | Crawford | 340—174 |
| 3,381,282 | 4/1968 | Flaherty et al. | 340—174 |

BERNARD KONICK, Primary Examiner

G. M. HOFFMAN, Assistant Examiner